United States Patent

[11] 3,552,638

| [72] | Inventor | John J. Quackenbush |
| | | Monroe, Conn. |
| [21] | Appl. No. | 752,689 |
| [22] | Filed | Aug. 14, 1968 |
| [45] | Patented | Jan. 5, 1971 |
| [73] | Assignee | National Distillers and Chemical Corporation |
| | | New York, N.Y. |
| | | a corporation of Virginia |

[54] PEEL-OPEN THERMOPLASTIC PACKAGE FOR STERILIZED ARTICLES
7 Claims, 5 Drawing Figs.

[52] U.S. Cl. .................................................. 229/66,
206/56, 229/3.5, 229/51, 161/252
[51] Int. Cl. ................................................... B65d
33/16, B65d 75/30
[50] Field of Search .......................................... 229/66,
48T, 51; 206/63.2, 56; 161/252; 229/3.5

[56] References Cited
UNITED STATES PATENTS

| 3,454,210 | 7/1969 | Spiegel et al. | 229/43 |
| 3,123,210 | 3/1964 | Hermanson et al. | 206/63.2 |
| 3,256,981 | 6/1966 | Kurtz | 206/56 |

Primary Examiner—David M. Bockenek
Attorney—Allen A. Meyer, Jr.

ABSTRACT: A peel-open bag formed of two opposing panels of laminated plastic layers. The panels are heat-sealed to one another along their tops, bottoms and sides to enclose a sterilized article. The laminated layers are of diverse plastics, the interior layers of which form a heat seal which is stronger than the bonding strength between the laminated layers. In order to open the bag, the panels are peeled apart, causing one of the layers to delaminate and tear along the heat seal. The panels are formed of laminates of polyethylene on the inside and Surlyn*A on the outside.

PATENTED JAN 5 1971
3,552,638
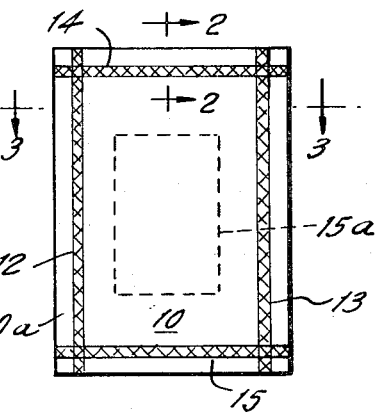
FIG.1
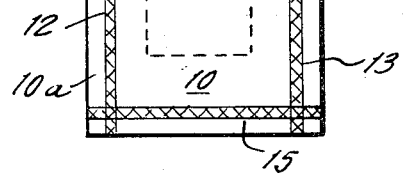
FIG.2
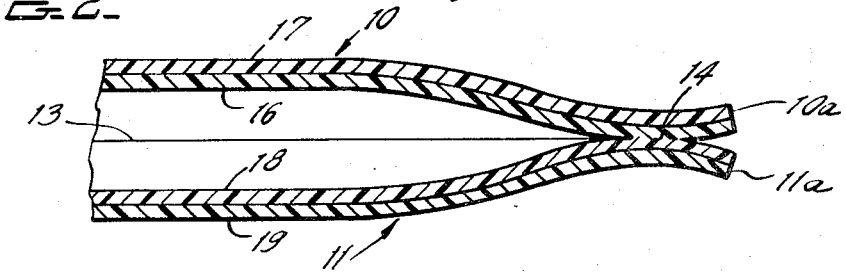
FIG.3
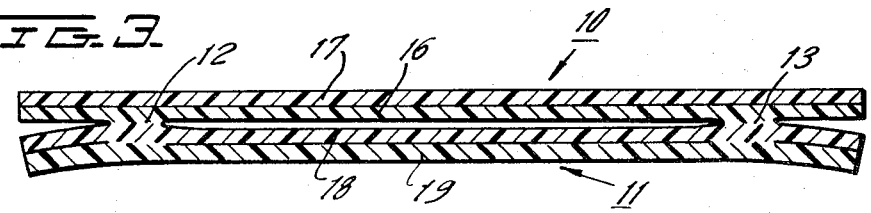
FIG.4
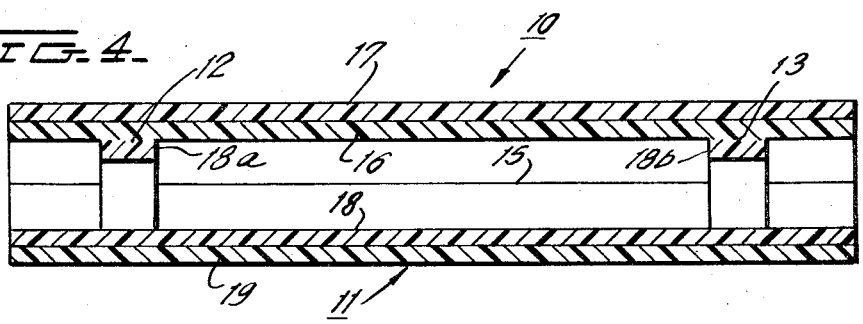
FIG.5
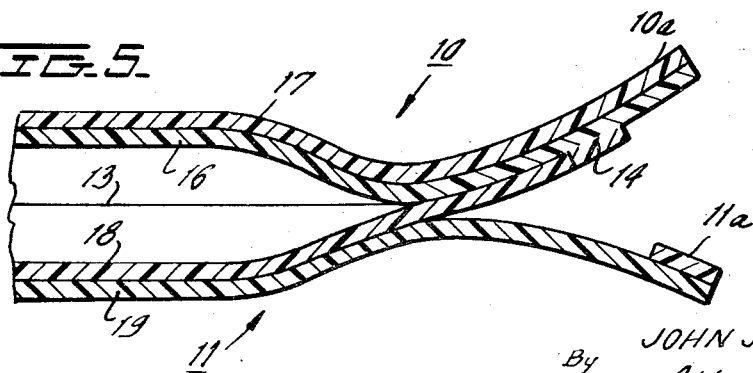
INVENTOR
JOHN J. QUACKENBUSH
By Allen A. Meyer, Jr.
ATTORNEY

PEEL-OPEN THERMOPLASTIC PACKAGE FOR STERILIZED ARTICLES

This invention relates to a plastic bag for packaging sterile articles, and more particularly relates to a plastic bag which can be loaded and sterilized in a suitable gas sterilizing apparatus and which can be conveniently peeled open. Many bags, or pouches, are known which can receive an article such as a bandage or surgical instrument, or the like, with the bag and article sterilized by loading into a sterilizing chamber, evacuating the chamber, and flushing the chamber with a sterilizing gas such as ethylene oxide. It is desirable that such containers are easily opened without danger of bringing contaminated portions of the bag in contact with its contents when the contents are removed from the bag.

One common bag structure is composed of one panel of a plastic and a second panel of paper. The paper-to-plastic seal is a poor seal so that the paper is easily peeled from the plastic to open the bag. Moreover, the paper panel permits good flow of sterilizing gas to the bag contents during the sterilizing procedure. However, with this type package, the contents can be easily contaminated as by a drop of water on the paper which could introduce harmful or contaminating agents to the bag contents.

Another common bag structure may be formed of two layers of polyethylene heat-sealed to one another with access to the bag obtained by tearing open the top of the bag. This opening process exposes the contents to possible contamination when the contents are removed from the bag as by contact with the torn edges of the bag top.

A further bag is commercially available in which two sheets of polyethylene are heat-sealed to one another by an intentionally weak heat seal, formed by printing black lines along the heat seal, and then exposing the bag to infrared heating. This type bag permits opening by peeling the panels apart to avoid danger of contaminating the bag contents. However, with this type bag, there is danger of rupturing the heat seal during the sterilizing process since, when the sterilizing chamber is evacuated, the air pressure within the bag creates a high differential pressure which may not be contained by the seal.

In accordance with the present invention, a novel peel-open pouch is formed of two panels which each consists of two laminated plastic layers. The interior layers are of a material which forms a good heat seal to itself, while the outer layers are of a material which are relatively weakly sealed to their respective interior layers. The bag or pouch is closed by heat sealing at the edges of the bag and at its top and bottom with a good heat seal being formed between the two interior layers of the two panels. The contents packaged within the heat seal bag may now be sterilized by placing the sealed bag within a suitable sterilizing chamber and applying the conventional gas sterilizing techniques described above. The heat seal formed between the two interior layers is sufficiently strong to withstand bursting of the bag or pouch when the chamber is evacuated, and permits the sterilization process to proceed when the gas is admitted into the chamber. Nevertheless, the bag may be peeled open along the heat seals, since one of the panels will delaminate along the heat seal edge as the two panels are peeled apart. The peeling open action permits access to the sterilized contents of the bag without danger of contamination of the contents by contact with the bag edges. Thus, the novel bag construction of the present invention avoids all the difficulties of the prior art structures, while still retaining the advantage of a completely plastic encapsulated sterilized product within the bag.

Accordingly, a primary object of this invention is to provide a novel peel open sterilized bag which can be sterilized in a gas sterilizing chamber.

Another object of this invention is to provide a novel peel open sterilized plastic container which is not subject to bursting when a sterilizing chamber is evacuated.

A further object of this invention is to provide a novel peel open sterilized container which provides a complete plastic sheath around a sterilized product.

These and other objects of this invention will become apparent from the following description when taken in connection with the drawings in which:

FIG. 1 is a front plan view of a bag constructed in accordance with the present invention.

FIG. 2 is a cross-sectional view of the bag of FIG. 1 taken across the section line 2–2 in FIG. 1.

FIG. 3 is a cross-sectional view of the bag of FIG. 1 taken across the section line 3–3 in FIG. 1.

FIG. 4 is a cross-sectional view similar to FIG. 3 when the bag of FIG. 1 has been partly peeled open.

FIG. 5 is a view similar to FIG. 2 which again shows the bag in a partly peeled-open condition.

Referring first to FIGS. 1, 2 and 3, there is illustrated therein a plastic container consisting of a front panel 10 and a rear panel 11 which are heat-sealed to one another along their sides, top and bottom by heat seals 12, 13, 14 and 15, respectively, to contain a sterilized article shown as dotted line article 15a in FIG. 1.

Each of panels 10 and 11 consist of the laminate of at least two layers, where the layers facing one another in the bag will hereinafter be designated as "interior layers," while the layers facing away from one another and facing the exterior of the bag will be designated the "exterior layers." Thus, panel 10 consists of an interior layer 16 and an exterior layer 17, while panel 11 similarly consists of an interior layer 18 and an exterior layer 19.

In accordance with the invention, the interior layers 16 and 18 are formed of a material which readily heat seals to to itself so that the heat seals 12, 13, 14 and 15 are strong. The exterior layers 17 and 19 are of a material which adheres relatively poorly to the interior layers 16 and 18. In particular, the seal strength between the interior layers 16 and 18 is made greater than the adherence strength between layers 16 and 17 or layers 18 and 19.

Numerous combinations of layers would satisfy this requirement. By way of example, the interior layers 16 and 18 could be of polyethylene, while exterior layers 17 and 19 could be of polypropylene, paper or nylon. Excellent results have been obtained when using a low-density polyethylene for the interior layers 16 and 18 and Surlyn A as the exterior layers 17 and 19. Surlyn A is an ionomer resin which is an ionic crosslinked ethylene-acrylic copolymer containing metallic ions from groups 1 or 2 of the periodic table and is commercially available as DuPont A1601 resin which has a rated density of .940. This material has good stress, crack and abrasion resistance which is desirable in the packaging of articles which are to be sterilized, while the two-layer arrangement makes the material pinhole-free and has a good ethylene oxide permeability to permit efficient sterilization of the interior contents in a gas sterilization chamber.

The interior polyethylene layers 16 and 18 can have any desired thickness of from about 1 & mils to 10 mils, and the Surlyn A thickness may be up to about 2 mils.

A specific combination of Surlyn A and polyethylene which is suitable for the package of the present invention is the laminated film known as Multifilm-20, a product of U.S.I. Film Products Division of National Distillers & Chemical Corp. This material has a nominal gauge thickness of about 4 mils, wherein the Surlyn A has a thickness of about 1 & mils, while the polyethylene has a thickness of about 2 & mils.

The material may be formed in any desired manner as by dual extrusion in a typical laminating die, or in any other desired manner. Typically, the material has a seal strength of about 250 grams/square centimeter, with the bond strength between the Surlyn and polyethylene being somewhat less than the seal strength of the heat seal between the opposite interior panels of polyethylene. Thus, the lamination will fail before the seal when the two bag panels are pried apart in order to obtain the peel opening characteristic of the present invention.

When using the bag, the article which is to be contained within the bag is placed between the panels, and the panels are sealed in the manner illustrated in FIG. 1, or in any other desired manner, such that at least one peel-open seal will provide access to the contents 15. The sealed bag is then placed in a standard sterilization chamber which is first evacuated and is thereafter flushed with ethylene oxide. During the evacuation process, the seal strength and lamination strength between laminates is sufficient to prevent bursting of the bag. After flushing with ethylene oxide for a predetermined cycle, the bag contents 15 will be sterilized, and the articles are removed from the sterilization chamber and are now ready for use.

In order to gain access to the interior contents 15a, a region external of the seal, for example, external of seal 14 in FIG. 2, permits the user to grip free ends 10a and 11a of panels 10 and 11. The panels are then pulled apart as shown in FIGS. 4 and 5, with this peeling action being permitted since the polyethylene layer of one panel extending along its respective heat seal will delaminate from its respective outer Surlyn A layer. For example, in FIG. 5, it is seen that the heat seal 14 was sufficiently strong to remain intact, even though the polyethylene layer portion 18 beneath heat seal 14 was torn away from outer layer 19.

After passing through the heat seal 14, the peeling action is continued as illustrated in FIG. 4, with strips 18a and 18b in FIG. 4 being torn away from inner layer 18 by virtue of the seals 12 and 13 being stronger than the strength of lamination of strips 18a and 18b to the Surlyn A layer 19. Obviously, the delamination could have occurred from panel 10 instead of panel 11 in FIGS. 4 and 5.

Thus, the entire bag can be simply peeled open so that access is had to the contents 15a without danger of contamination of the contents by contact with the edges of the opened bag.

I claim:

1. A peel-open, ethylene-oxide permeable bag for sterilized articles comprising a first bag panel, a second bag panel, means joining the sides, top and bottom of said first and second bag panels including at least one heat seal; said first bag panel consisting of interior and exterior layers of a first and second thermoplastic material, respectively; the interior of said second panel being of a thermoplastic material characterized in forming a heat seal to said interior layer having a first adhesion strength; said first and second materials characterized in laminating to one another with a second adhesion strength; said first adhesion strength greater than said second adhesion strength, whereby said bag can be opened by peeling said panels apart with said first and second materials delaminating along said at least one heat seal.

2. The bag of claim 1 wherein said second panel is formed of interior and exterior layers of said first and second thermoplastic materials, respectively.

3. The bag of claim 1 wherein said at least one heat seal extends along the sides and top of said first and second panels.

4. The bag of claim 1 wherein said first material is low density polyethylene.

5. The bag of claim 1 wherein said first material is low-density polyethylene and wherein said second material is an ionic crosslinked ethylene acrylic copolymer containing group 1 or 2 metallic ions.

6. The bag of claim 2 wherein said first material is low-density polyethylene.

7. The bag of claim 2 wherein said first material is low-density polyethylene and wherein said second material is an ionic crosslinked ethylene acrylic copolymer containing group 1 or 2 metallic ions.